(12) United States Patent
Jonnala et al.

(10) Patent No.: US 10,346,076 B1
(45) Date of Patent: Jul. 9, 2019

(54) METHOD AND SYSTEM FOR DATA DEDUPLICATION BASED ON LOAD INFORMATION ASSOCIATED WITH DIFFERENT PHASES IN A DATA DEDUPLICATION PIPELINE

(71) Applicant: EMC IP Holding Company LLC, Hopkinton, MA (US)

(72) Inventors: Uday Kiran Jonnala, Cupertino, CA (US); Yamini Allu, Sunnyvale, CA (US); Pradeep Thomas, Santa Clara, CA (US); Abhishek Rajimwale, San Jose, CA (US); Balaji Subramanian, Belmont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/641,047

(22) Filed: Jul. 3, 2017

(51) Int. Cl.
*G06F 3/06* (2006.01)
(52) U.S. Cl.
CPC ........... *G06F 3/0641* (2013.01); *G06F 3/067* (2013.01); *G06F 3/0611* (2013.01); *G06F 3/0634* (2013.01); *G06F 3/0659* (2013.01)
(58) Field of Classification Search
CPC .... G06F 3/0641; G06F 3/0611; G06F 3/0659; G06F 3/0634; G06F 3/067

USPC ......................................................... 711/159
See application file for complete search history.

(56) References Cited

U.S. PATENT DOCUMENTS

2012/0089579 A1* 4/2012 Ranade ............ G06F 17/30153
707/693

\* cited by examiner

*Primary Examiner* — Hua J Song
(74) *Attorney, Agent, or Firm* — Womble Bond Dickinson (US) LLP (57) ABSTRACT

According to some embodiment, a backup storage system receives, by a first phase of a data deduplication pipeline, a request from a client for reading or writing a data segment associated with a data stream stored in or to a storage system. In response to the request, the system retrieves, by the first phase, load parameters associated with a second phase in the data deduplication pipeline. For each of the load parameters associated with the second phase, the system determines, by the first phase, whether the load parameter has exceeded a load threshold associated with the second phase. The system throttles, by the first phase, performance of a specific job in the data deduplication pipeline by the second phase in response to a determination that at least one of the load parameters associated with the second job phase has exceeded the load threshold associated with the second phase.

18 Claims, 6 Drawing Sheets

| | Protocol Module 301 | Chunking Module 303 | Fingerprint Module 305 | Fingerprint Verification Module 307 | Compressor/Decompressor Module 309 |
|---|---|---|---|---|---|
| Stream ID 321 | <queue depth> <latency> | <queue depth> <latency> | <queue depth> <latency> | <queue depth> <latency> | <queue depth> <latency> |
| Stream ID 323 | <queue depth> <latency> | <queue depth> <latency> | <queue depth> <latency> | <queue depth> <latency> | <queue depth> <latency> |
| Stream ID 325 | <queue depth> <latency> | <queue depth> <latency> | <queue depth> <latency> | <queue depth> <latency> | <queue depth> <latency> |

FIG. 3

| | Queue Depth Threshold (module level) 401 | Latency Threshold (module level) 403 | Queue Depth Threshold (system level) 405 | Latency Threshold (system level) 407 |
|---|---|---|---|---|
| Protocol Module 421 | Threshold 1 | Threshold 2 | Threshold 3 | Threshold 4 |
| Chunking Module 423 | Threshold 1 | Threshold 2 | Threshold 3 | Threshold 4 |
| Fingerprint Module 425 | Threshold 1 | Threshold 2 | Threshold 3 | Threshold 4 |
| Fingerprint Verification Module 427 | Threshold 1 | Threshold 2 | Threshold 3 | Threshold 4 |
| Compressor/Decompressor Module 429 | Threshold 1 | Threshold 2 | Threshold 3 | Threshold 4 |

METHOD AND SYSTEM FOR DATA DEDUPLICATION BASED ON LOAD INFORMATION ASSOCIATED WITH DIFFERENT PHASES IN A DATA DEDUPLICATION PIPELINE

FIELD OF THE INVENTION

Embodiments of the present invention relate generally to data storage systems. More particularly, embodiments of the invention relate to method and system for data deduplication based on load information associated with different phases in a data deduplication pipeline.

BACKGROUND

Backup storage systems traditionally have been designed and optimized such that data is stored and restored from the backup storage systems in a sequential manner. Modern backup technologies, such as VM Instant Access/Instant Restore from EMC and changed block tracking (CBT), however do not access data sequentially. Instead, such modern backup technologies may access data randomly. To provide better performance for random input/output (IO) workloads, backup storage systems have largely been retrofitted and tuned for random IO, e.g., read/write, processing.

Furthermore, a file system with support for improving random IO workloads in the backup storage systems would issue additional number of IO requests. On the other hand, sequential IO workloads are processed serially in order to achieve good locality. As such, random IO workloads may generate more IO loads on a particular backup storage system as opposed to the sequential TO workloads. This may lead to imbalance of performance for different types of TO workloads and may result in a client timing out.

With respect to a data deduplication system, a data stream may pass through different stages of execution (e.g., data segmentation, fingerprint calculation, fingerprint verification, compression/decompression, etc.). Complicating matters, some data segments (e.g., duplicate data segments) may not pass through the same stages of execution as other data segments (e.g., non-duplicate data segments), thereby generating different loads on the data deduplication system. This creates complications in understanding the loads on the system and predicting a timeout of a client.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, a storage service engine and/or deduplication storage engine of a storage system may maintain load information for each phase or module in a data deduplication pipeline, and load thresholds associated with the particular phase. For example, the storage service engine and/or deduplication storage engine may keep track of a queue depth and latency associated with a phase or module (e.g., protocol module, chunking module, fingerprint module, fingerprint verification module, and compressor/decompressor module) in the data deduplication pipeline. The load thresholds, for example, may include queue depth thresholds (at phase and system levels), latency thresholds (at phase and system levels). In one aspect, the storage system receives, by a first phase of a data deduplication pipeline, a request from a client for reading or writing a data segment associated with a data stream stored in or to a storage system. In response to the request, the system retrieves, by the first phase, load parameters associated with a second phase in the data deduplication pipeline. For each of the load parameters associated with the second phase, the system determines, by the first phase, whether the load parameter has exceeded a load threshold associated with the second phase. The system throttles, by the first phase, performance of a specific job in the data deduplication pipeline by the second phase in response to a determination that at least one of the load parameters associated with the second job phase has exceeded the load threshold associated with the second phase.

According to another aspect of the invention, in response to a determination that none of the load parameters associated with the second phase has exceeded the load threshold associated with the second phase, the storage system enqueues an entry into a job queue corresponding to the second phase, where the entry commands the performance the specific job in the data deduplication pipeline by the second phase.

According to another aspect of the invention, the storage system retrieves, by the second phase, a plurality of load parameters associated with a third phase. For each of the load parameters associated with the third phase, the storage system determines, by the second phase, whether the load parameter has exceeded a load threshold associated with the third phase. The storage system throttles, by the second phase, performance of a specific job in the data deduplication pipeline by the third phase in response to a determination that at least one of the load parameters associated with the third phase has exceeded the load threshold associated with the third phase.

Figure 1:
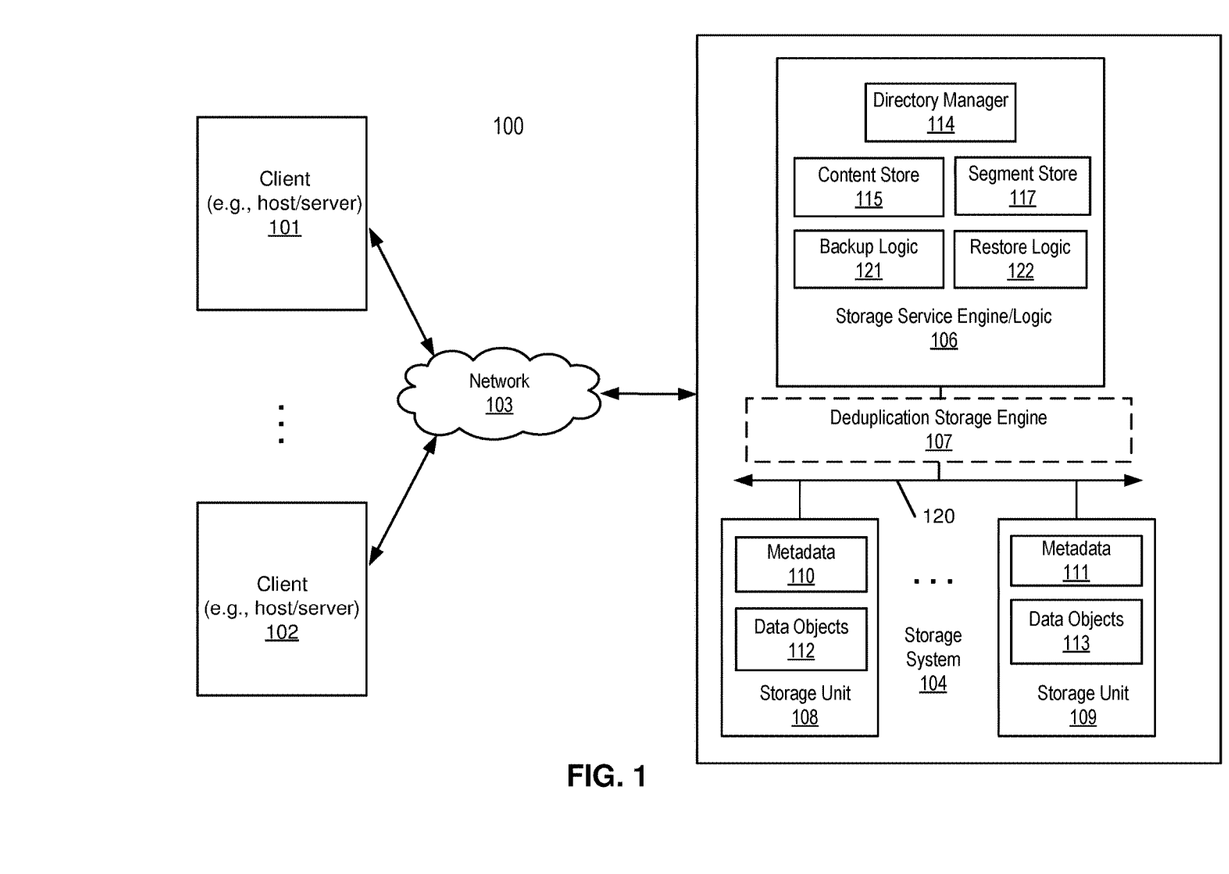
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, optional backup logic 121, and optional restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117). Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
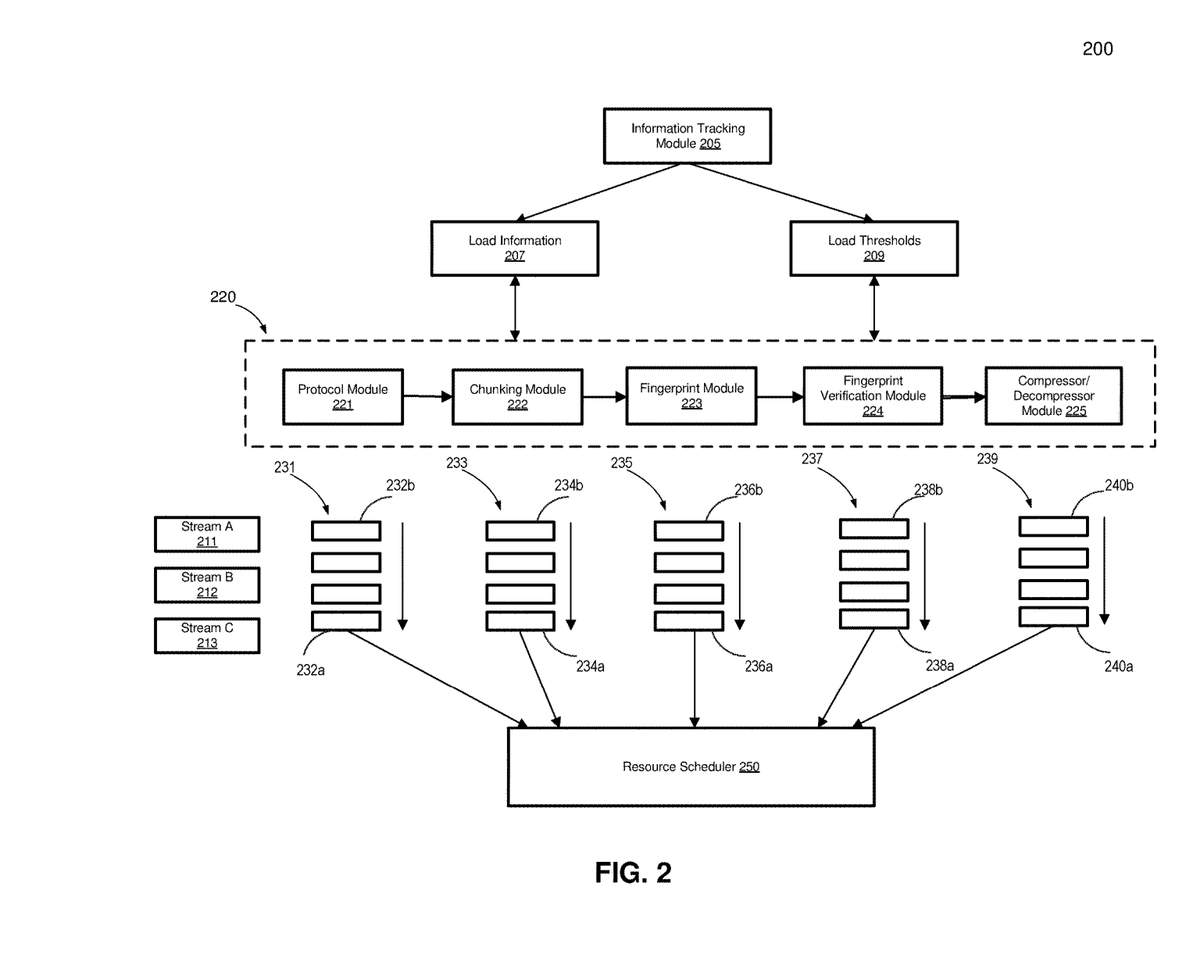
FIG. 2 is a block diagram of an example data deduplication architecture according to one embodiment of the invention.

FIG. 2 is a block diagram of an example data deduplication architecture according to one embodiment of the invention. In some embodiments, data deduplication architecture 200 may be implemented within the storage system 104 of FIG. 1, e.g., storage service engine 106 and/or the deduplication storage engine 107 of FIG. 1. As shown in FIG. 2, data deduplication pipeline 220 may include multiple modules or phases that are configured to perform a specific IO workload or job, such as protocol module 221, chunking module 222, fingerprint module 223, fingerprint verification module 224, and compressor/decompressor module 225.

Protocol module 221 may receive a request from a client (e.g., clients 101-102) to perform input/output (TO) operations of a data segment associated with a data stream or file object, such as data streams 211-213. For example, the protocol module 221 may parse or decode a request received from a particular client to identify the type of IO operation to be performed on a data stream or file object (e.g., read/write operation). In one embodiment, the protocol module 221 may get the inode representing a file object in order to obtain a content handle (CH) stored in the inode. In one embodiment, the protocol module 221 may obtain attributes from the inode to determine the subsequent operations that need to be performed on the file object (e.g., segmentation, fingerprinting, compression/decompression, etc.).

Chunking module 222 is configured to segment the data stream or file object into multiple segments (also referred to as chunks) according to a variety of segmentation policies or rules. In some embodiments, the chunks may be compressed or decompressed. In one embodiment, content store 115 may retrieve compressed data segments via segment store 117 from an identified container of a storage unit, decompresses, and returns the retrieved data segments to the client. In this case, the chunking module 222 may divide decompressed data segment retrieved by content store 115 into segments for storage. In one embodiment, when a client backs up data, data segments may be an incremental backup representing a difference between a first snapshot and a second snapshot of backups taken at different points in time. Snapshot is an image of an instance in time of a backup system. In this scenario, chunking module 222 may divide the difference or delta segments into segments for storage.

Fingerprint module 223 is configured to calculate and generate fingerprints for data segments. For example, fingerprint module 223 may invoke a fingerprinting algorithm to generate a set of fingerprints for data segments of a data stream or file object such that the fingerprints are mapped to the data stream or file object. That is, the fingerprints may be utilized to identify or locate the data stream or file object. In some embodiments, the fingerprinting algorithm may be a Rabin's algorithm or a hash function (e.g., cryptographic hash function).

Fingerprint verification module 224 is configured to search the fingerprints in order to detect duplicate data segments. For instance, if a data segment is a duplicate then such data segment will not be fingerprinted or stored to a storage unit (e.g., storage units 108-109). However, if the data segment is not a duplicate then such data segment may be fingerprinted (e.g., via fingerprint module 223) and stored to the storage unit.

Compressor/decompressor module 225 may compress the data segments prior to storing the data segments into a storage unit. Compressor/decompressor module 225 may also decompress data segments retrieved from a container of a storage unit prior to returning the retrieved data segments to the client.

Accordingly, referring to FIG. 2, load information 207 may be maintained via an information tracking module 205, which may be implemented within storage service engine 106 and/or deduplication storage engine 107, for each of the protocol module 221, chunking module 222, fingerprint module 223, fingerprint verification module 224, and compressor/decompressor module 225. Load information 207 may include parameters such as queue depth and latency. Queue depth refers to a number of IO requests that is queued at a given time. Latency refers to a time for performing an IO workload or job by a particular module or phase within a data deduplication pipeline. In some embodiments, the information tracking module 205 may further maintain load thresholds 209 that may include queue depth thresholds (at module and system levels) and latency thresholds (at module and system levels) for each of the protocol module 221, chunking module 222, fingerprint module 223, fingerprint verification module 224, and compressor/decompressor module 225. In some embodiments, load thresholds 209 may be dynamically updated by information tracking module 205 depending on several factors. For example, at the module level, queue depth threshold (i.e., maximum number of IO requests) may be increased and latency threshold (i.e., maximum time to perform a particular IO workload) may be decreased for a data stream that requires sequential IO workload (e.g., a sequential read) as the sequential IO workload imposes less system load. On the other hand, if a data stream requires a random IO workload (e.g., random read at different memory locations of a storage unit) then the queue depth threshold may be decreased and latency threshold may be increased as the random IO workload imposes a heavier system load. Furthermore, at the system level, queue depth threshold and latency threshold may be dynamically updated based on several resource instances, for example central processing unit (CPU) utilization, memory (e.g., random access memory and virtual memory usage), hard disk and solid state drives (e.g., free space), cache space (e.g., CPU cache), network throughput, etc. For example, if the storage system is operating with a heavy resource usage, then the queue depth threshold may be decreased and latency threshold may be increased to impose less system load on the storage system. Conversely, if the storage system is operating with a low resource usage, then the queue depth threshold may be increased and latency threshold may be decreased as the system can handle a heavier load.

In operation, when protocol module 221 receives a request to perform an IO operation of a data segment associated with a data stream (e.g., data streams 211-213), the protocol module 221 may query or retrieve queue depth and latency parameters associated with the protocol module 221 from load information 207. Subsequently, the protocol module 221 may perform comparisons of the retrieved queue depth and latency parameters to the queue depth thresholds and latency thresholds (at both module and system levels) associated with the protocol module 221 in load thresholds 209. If the queue depth exceeds any of the queue depth thresholds (at module or system level) or if the latency exceeds any of the latency thresholds (at module or system level) associated with the protocol module 221, then protocol module 221 may throttle performance of the workload of the protocol module 221. That is, in one embodiment, the protocol module 221 may cease to enqueue or push an entry into protocol module job queue 231, which includes a head 232a and a tail 232b, where each entry in the protocol module job queue 231 commands or triggers performance of the workload or job by the protocol module 221. In some embodiments, the protocol module 221 may cease to enqueue the entry for a specific time period, or until none of the queue depth and latency thresholds is exceeded. In another embodiment, to throttle performance of the workload, the protocol module 221 may delay in sending a response or acknowledgement to the client to indicate that the request to perform the IO operation has been processed. In some embodiments, to throttle performance of the workload, the protocol module 221 may notify or inform the client about the heavy system load being imposed on the storage system so that the client may effectively throttle (e.g., sending the request to perform IO operations at a lower rate or stop/pause sending of the request) to avoid timing out of the system.

On the other hand, if none of the queue depth and latency thresholds is exceeded, the protocol module 221 may enqueue or push an entry into protocol module job queue 231 to perform its IO workload. In some embodiments, the protocol module 221 may enqueue the entry even if some or a subset of the queue depth and latency thresholds are exceeded.

Subsequently, the protocol module 221 may query a subsequent module, in this case the chunking module 222, to determine whether the chunking module 222 is overloaded. For example, the protocol module 221 may retrieve queue depth and latency parameters associated with the chunking module 222 from load information 207. Again, in a similar fashion, the protocol module 221 may perform comparisons of the retrieved queue depth and latency of the chunking module 222 to queue depth thresholds and latency thresholds associated with the chunking module 222. If the queue depth or latency exceeds any of the queue depth thresholds or latency thresholds respectively, the protocol module 221 may throttle performance of the workload of the chunking module 222. That is, in one embodiment, the protocol module 221 may cease to enqueue an entry into chunking module job queue 233, which includes a head 234*a* and a tail 234*b*, where each entry in the chunking module job queue 233 triggers performance of the workload or job by the chunking module 222. In some embodiments, the protocol module 221 may cease to enqueue the entry for a specific time period, or until none of the queue depth and latency thresholds is exceeded. In another embodiment, to throttle performance of the workload, the protocol module 221 may delay in sending a response or acknowledgement to the client to indicate that the IO request has been processed.

On the other hand, if none of the queue depth and latency thresholds is exceeded, the protocol module 221 may enqueue an entry into chunking module job queue 233 to perform the IO workload of the chunking module 222. In some embodiments, the protocol module 221 may enqueue the entry even if some or a subset of the queue depth and latency thresholds are exceeded.

Subsequently, the chunking module 222 may query the fingerprint module 223 to determine whether the fingerprint module 223 is overloaded. The chunking module 222 may retrieve queue depth and latency parameters associated with the fingerprint module 223 from load information 207. In this scenario, the chunking module 222 may perform comparisons of the retrieved queue depth and latency of the fingerprint module 223 to queue depth thresholds and latency thresholds associated with the fingerprint module 223 from load thresholds 209. If the queue depth or latency exceeds any of the queue depth thresholds or latency thresholds respectively, the chunking module 222 may throttle performance of the IO workload of the fingerprint module 223 in a similar fashion as previously discussed. For example, in one embodiment, the chunking module 222 may cease to enqueue an entry into fingerprint module job queue 235, which includes a head 236*a* and a tail 236*b*, where each entry in the fingerprint module job queue 235 triggers performance of the IO workload or job by the fingerprint module 223. In some embodiments, the chunking module 222 may cease to enqueue the entry for a specific time period, or until none of the queue depth and latency thresholds is exceeded. In another embodiment, to throttle performance of the workload, the chunking module 222 may delay in sending a response or acknowledgement to the client to indicate that the IO request has been processed.

If none of the queue depth and latency thresholds is exceeded, the chunking module 222 may enqueue or push an entry into fingerprint module job queue 235 to perform the IO workload of the fingerprint module 223. In some embodiments, the chunking module 222 may enqueue the entry even if some or a subset of the queue depth and latency thresholds are exceeded.

Subsequently, the fingerprint module 223 may query the fingerprint verification module 224 to determine whether the fingerprint verification module 224 is overloaded. For example, the fingerprint module 223 may retrieve queue depth and latency parameters associated with the fingerprint verification module 224 from load information 207. In this scenario, the fingerprint module 223 may perform comparisons of the retrieved queue depth and latency of the fingerprint verification module 224 to queue depth thresholds and latency thresholds associated with the fingerprint verification module 224 from load thresholds 209. If the queue depth or latency exceeds any of the queue depth thresholds or latency thresholds respectively, the fingerprint module 223 may throttle performance of the IO workload of the fingerprint verification module 224 in a similar manner as previously discussed. For example, in one embodiment, the fingerprint module 223 may cease to enqueue an entry into fingerprint verification module job queue 237, which includes a head 238*a* and a tail 238*b*, where each entry in the fingerprint verification module job queue 237 triggers performance of the IO workload or job by the fingerprint verification module 224. In some embodiments, the fingerprint module 223 may cease to enqueue the entry for a specific time period, or until none of the queue depth and latency thresholds is exceeded. In another embodiment, to throttle performance of the workload, the fingerprint module 223 may delay in sending a response or acknowledgement to the client to indicate that the IO request has been processed.

If none of the queue depth and latency thresholds is exceeded, the fingerprint module 223 may enqueue or push an entry into fingerprint verification module job queue 237 to perform the IO workload of the fingerprint verification module 224. In some embodiments, the fingerprint module 223 may enqueue the entry even if some or a subset of the queue depth and latency thresholds are exceeded.

Subsequently, the fingerprint verification module 224 may query the compressor/decompressor module 225 to determine whether the compressor/decompressor module 225 is overloaded. For example, the fingerprint verification module 224 may retrieve queue depth and latency parameters associated with the compressor/decompressor module 225 from load information 207. In this scenario, the fingerprint verification module 224 may perform comparisons of the retrieved queue depth and latency of the compressor/decompressor module 225 to queue depth thresholds and latency thresholds associated with the compressor/decompressor module 225 from load thresholds 209. If the queue depth or latency exceeds any of the queue depth thresholds or latency thresholds respectively, the fingerprint verification module 224 may throttle performance of the IO workload of the compressor/decompressor module 225 in a similar manner as previously discussed. For example, in one embodiment, the fingerprint verification module 224 may cease to enqueue an entry into compressor/decompressor module job queue 239, which includes a head 240*a* and a tail 240*b*, where each entry in the compressor/decompressor module job queue 239 triggers performance of the IO workload or job by the compressor/decompressor module 225. In some embodiments, the fingerprint verification module 224 may cease to enqueue the entry for a specific time period, or until none of the queue depth and latency thresholds is exceeded. In another embodiment, to throttle performance of the workload, the fingerprint verification module 224 may delay in sending a response or acknowledgement to the client to indicate that the IO request has been processed.

If none of the queue depth and latency thresholds is exceeded, the fingerprint verification module 224 may enqueue or push an entry into compressor/decompressor module job queue 239 to perform the IO workload of the compressor/decompressor module 225. In some embodiments, the fingerprint verification module 224 may enqueue the entry even if some or a subset of the queue depth and latency thresholds are exceeded. In some embodiments, the queue depth threshold (at module or system level) may be 1000 IO requests.

Resource scheduler 250 is configured to assign the IO workload of each of the modules (e.g., protocol module 221, chunking module 222, fingerprint module 223, fingerprint verification module 224, and compressor/decompressor module 225) to resources in order to complete the workload. For example, the resource scheduler 250 may dequeue or pop the head of each job queue (e.g., protocol module job queue 231, chunking module job queue 233, fingerprint module job queue 235, fingerprint verification module job queue 237, compressor/decompressor job queue 239) to obtain the entry that triggers performance of a particular IO workload by a respective module. To carry out the workload, resource scheduler 250 assigns the IO workload performed by the respective module to system resources (e.g., CPU, memory, hard disk drive, solid state drive, etc.). In assigning the workload to resources, resource scheduler 250 may aim at one of several goals, for example, maximizing throughput and minimizing latency.

In some embodiments, to perform the mechanism as previously discussed with respect to each of the modules, each module may be tagged with a module name (e.g., "protocol", "chunking", "fingerprint", "fingerprint verification", "compressor/decompressor") and a workload identification (e.g., a data stream identification). In addition, in various embodiments, performing the mechanism, as discussed above, may improve and provide effective resource utilization of the storage system, and avoid timing out of the system. It should be noted that while the data deduplication pipeline 220 includes five modules in the example architecture shown in FIG. 2, in various embodiments, the previously described mechanism may be performed for any number of modules in a data deduplication pipeline.

Figure 3:
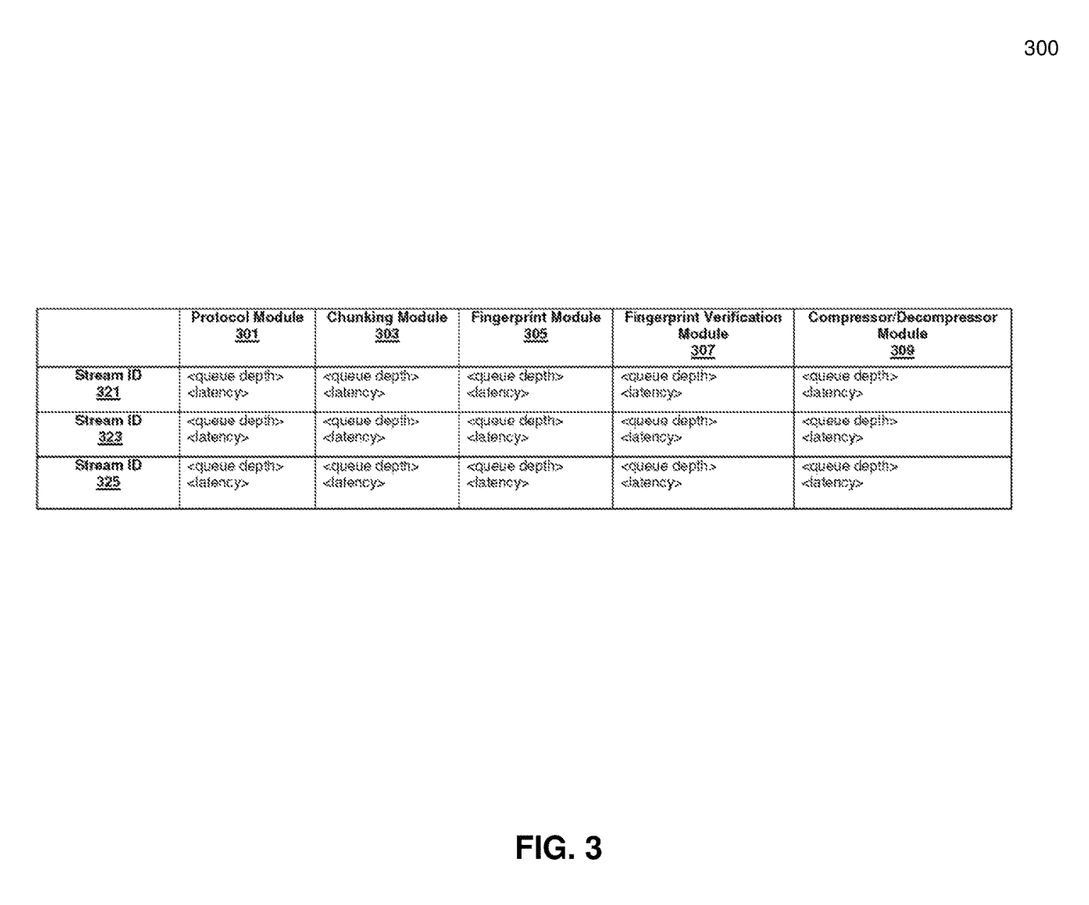
FIG. 3 is a table of load information according to one embodiment of the invention.

FIG. 3 is a table of load information according to one embodiment of the invention. In some embodiments, table 300 may be implemented within load information 207 of FIG. 2. The table 300 shown includes a protocol module column 301, chunking module column 303, fingerprint module column 305, fingerprint verification module column 307, and compressor/decompressor module column 309. Each of data stream identification (ID) 321-325 is a reference to obtain queue depth and latency parameters for each of the module columns 301-309. That is, the queue depth and latency values in a single row of the module columns 301-309 are mapped to a corresponding data stream ID in that row. As an example, if a module is tagged with data stream ID 321 and module name of "protocol module", then the queue depth and latency would be retrieved at the row represented by data stream ID 321 and the column represented by protocol module column 301. It should be appreciated that the order of stream ID rows 321-325 and module columns 301-309 presented in FIG. 3 may be in any order and is not limited to the order shown in FIG. 3.

Figure 4:
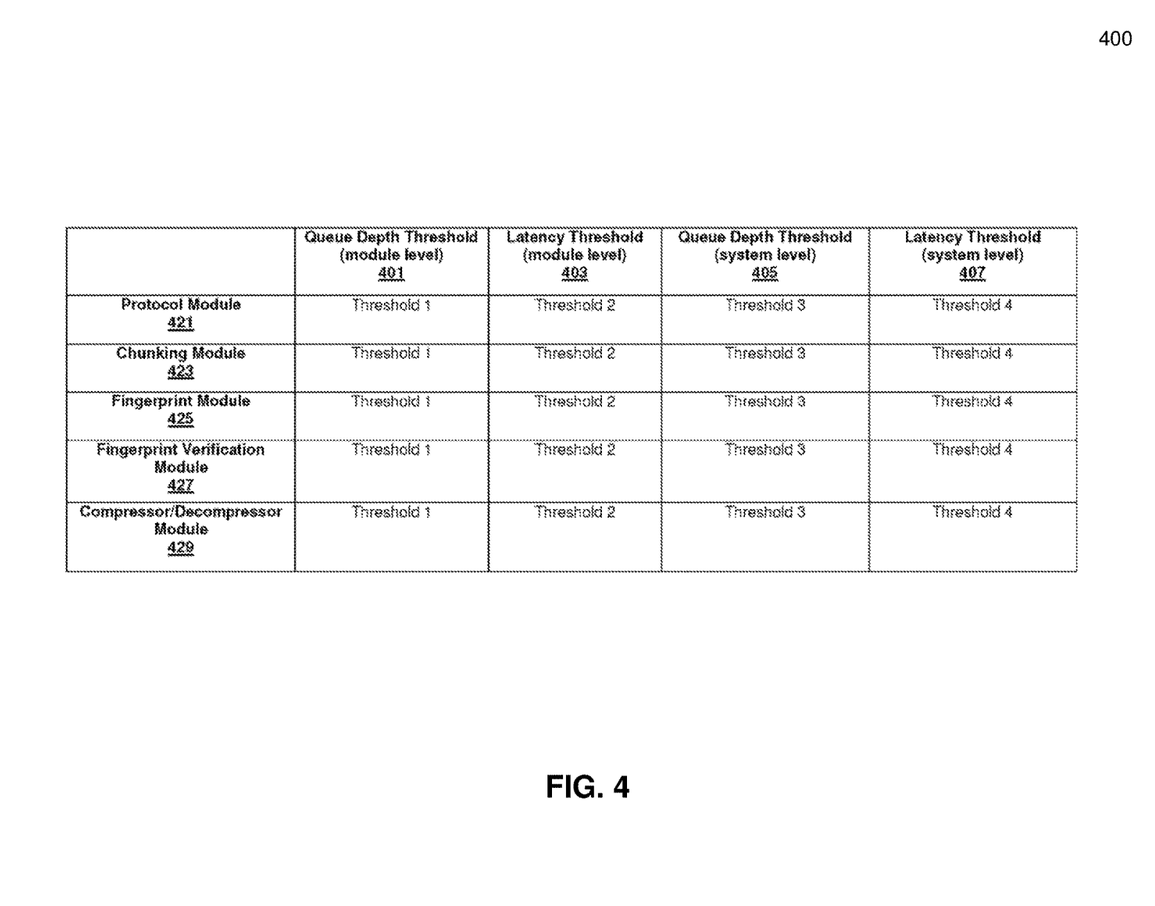
FIG. 4 is a table of load thresholds according to one embodiment of the invention.

FIG. 4 is a table of load thresholds according to one embodiment of the invention. In some embodiments, table 400 may be implemented within load thresholds 209 of FIG. 2.

The table 400 shown includes a queue depth threshold (module level) column 401, a latency threshold (module level) column 403, a queue depth threshold (system level) column 405, and a latency threshold (system level) column 407. Each of module rows 421-429 is a reference to obtain threshold values from the columns 401-407. That is, the threshold values in a single row of columns 401-407 are mapped to a corresponding module in that row. As an example, if chunking module row 423 is selected as a reference, then the threshold values at that row would be utilized for comparison (as previously discussed). It should be appreciated that the order of the module rows 421-429 and threshold columns 401-407 presented in FIG. 4 may be in any order and is not limited to the order shown in FIG. 4.

Figure 5:
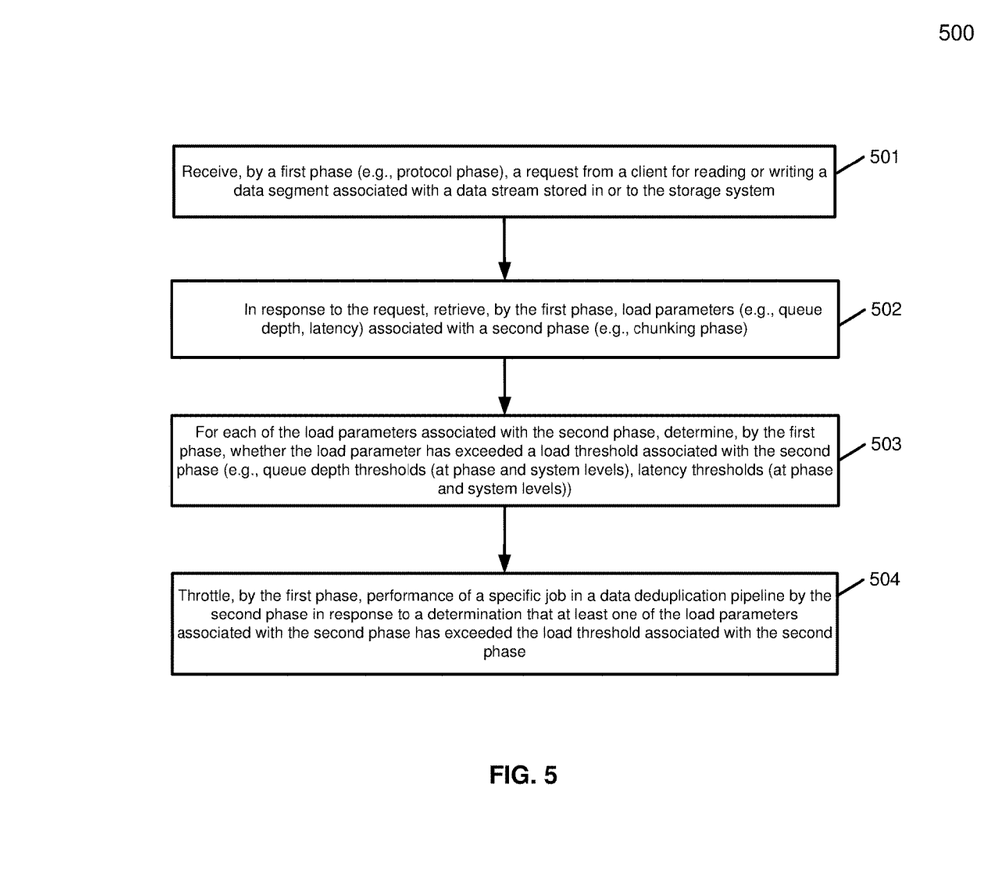
FIG. 5 is a flow diagram illustrating a method to perform data deduplication in a storage system according to one embodiment of the invention.

FIG. 5 is a flow diagram illustrating a method to perform data deduplication in a storage system according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by storage system 104 of FIG. 1 (e.g., storage service engine 106 and/or deduplication storage engine 107).

Referring to FIG. 5, at block 501, processing logic receives, by a first phase (e.g., protocol phase or module), a request from a client for reading or writing a data segment associated with a data stream stored in or to the storage system. At block 502, in response to the request, the processing logic retrieves, by the first phase, a plurality of load parameters (e.g., queue depth, latency) associated with a second phase (e.g., chunking phase). At block 503, for each of the load parameters associated with the second phase, the processing logic determines, by the first phase, whether the load parameter has exceeded a load threshold associated with the second phase (e.g., queue depth thresholds (at phase and system levels), latency thresholds (at phase and system levels)). At block 504, the processing logic throttles, by the first phase, performance of a specific job in a data deduplication pipeline by the second phase in response to a determination that at least one of the load parameters associated with the second job phase has exceeded the load threshold associated with the second phase.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
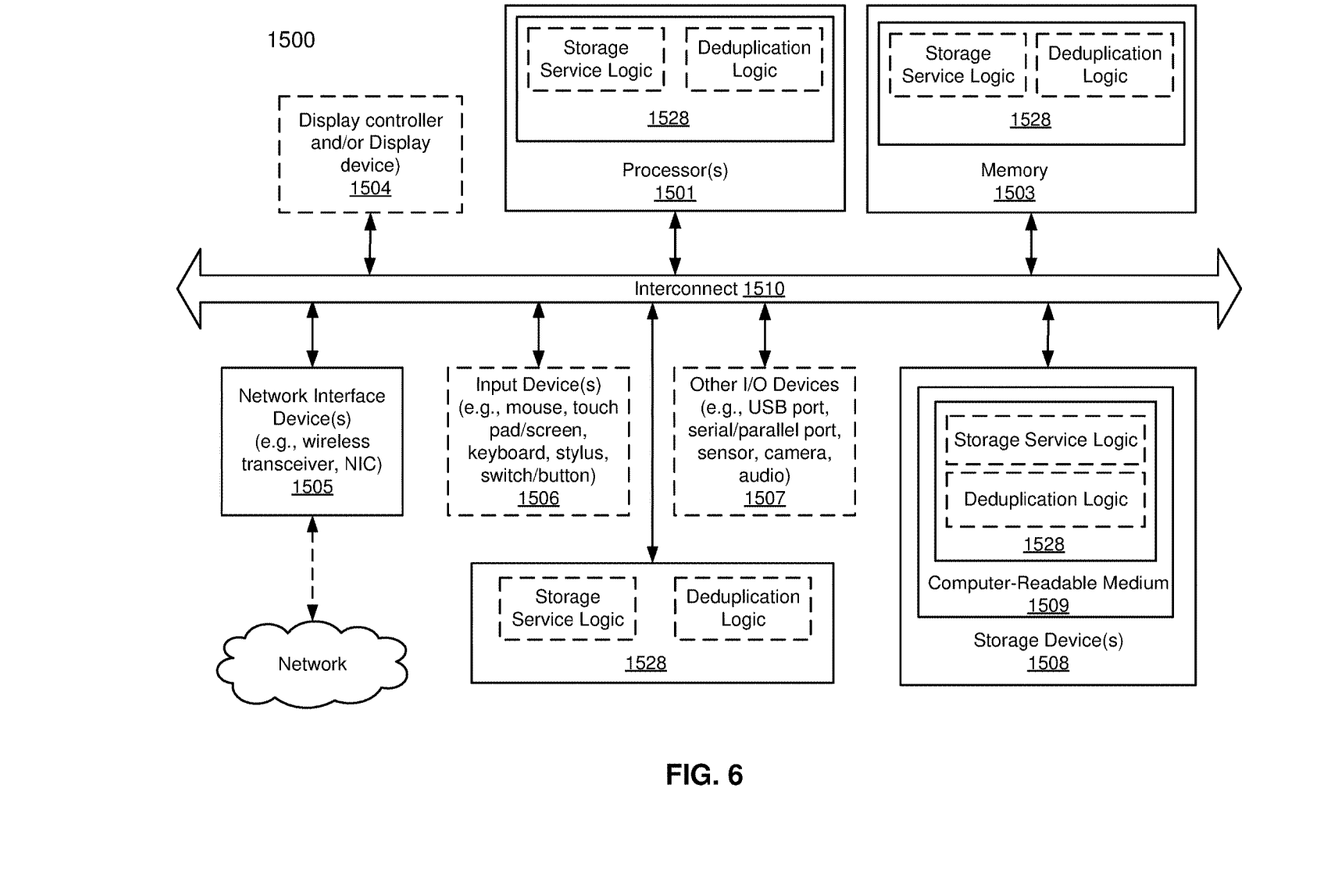
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for performing data deduplication in a storage system by a plurality of phases in a data deduplication pipeline, each of the phases configured to perform a specific job in the data deduplication pipeline, the method comprising:
   receiving, by a protocol phase, a request from a client for reading or writing a data segment associated with a data stream stored in or to the storage system, wherein the protocol phase is configured to determine a type of request from the request received from the client;
   in response to the request,
      retrieving, by the protocol phase, a plurality of load parameters associated with a chunking phase, wherein the chunking phase is configured to segment the data stream into data segments;
      for each of the load parameters associated with the chunking phase, determining, by the protocol phase, whether the load parameter has exceeded a load threshold associated with the chunking phase; and
      throttling, by the protocol phase, the segmenting of the data stream by the chunking phase in response to a determination that at least one of the load parameters associated with the chunking phase has exceeded the load threshold associated with the chunking phase.

2. The method of claim 1, further comprising:
   in response to a determination that none of the load parameters associated with the chunking phase has exceeded the load threshold associated with the chunking phase,
      enqueuing an entry into a job queue corresponding to the chunking phase, wherein the entry commands the segmenting of the data stream by the chunking phase.

3. The method of claim 2, further comprising:
retrieving, by the chunking phase, a plurality of load parameters associated with a fingerprint phase, wherein the fingerprint phase is configured to calculate a fingerprint for each of the data segments;
for each of the load parameters associated with the fingerprint phase, determining, by the chunking phase, whether the load parameter has exceeded a load threshold associated with the fingerprint phase; and
throttling, by the chunking phase, the calculating of the fingerprint by the fingerprint phase in response to a determination that at least one of the load parameters associated with the fingerprint phase has exceeded the load threshold associated with the fingerprint phase.

4. The method of claim 1, wherein throttling the segmenting of the data stream by the chunking phase comprises ceasing to enqueue an entry into a job queue corresponding to the chunking phase, wherein the entry commands the segmenting of the data stream by the chunking phase.

5. The method of claim 1, wherein throttling the segmenting of the data stream by the chunking phase comprises delaying response to the client indicating the request has been processed.

6. The method of claim 1,
wherein the load parameters associated with the chunking phase include a queue depth and a latency associated with the chunking phase; and
wherein the load threshold associated with the chunking phase is a queue depth threshold at a phase level, a latency threshold at the phase level, a queue depth threshold at a system level, or a latency threshold at the system level.

7. The method of claim 1, wherein each of the protocol phase and the chunking phase is tagged with a name and a data stream identification.

8. A non-transitory machine-readable medium having instructions stored therein, which when executed by a processor, cause the processor to perform operations, the operations comprising:
receiving, by a protocol phase in a data deduplication pipeline, a request from a client for reading or writing a data segment associated with a data stream stored in or to a storage system, wherein the protocol phase is configured to determine a type of request from the request received from the client;
in response to the request,
retrieving, by the protocol phase, a plurality of load parameters associated with a chunking phase in the data deduplication pipeline, wherein the chunking phase is configured to segment the data stream into data segments;
for each of the load parameters associated with the chunking phase, determining, by the protocol phase, whether the load parameter has exceeded a load threshold associated with the chunking phase; and
throttling, by the protocol phase, the segmenting of the data stream by the chunking phase in response to a determination that at least one of the load parameters associated with the chunking phase has exceeded the load threshold associated with the chunking phase.

9. The non-transitory machine-readable medium of claim 8, wherein the operations further comprise:
in response to a determination that none of the load parameters associated with the chunking phase has exceeded the load threshold associated with the chunking phase,
enqueuing an entry into a job queue corresponding to the chunking phase, wherein the entry commands the segmenting of the data stream by the chunking phase.

10. The non-transitory machine-readable medium of claim 9, wherein the operations further comprise:
retrieving, by the chunking phase, a plurality of load parameters associated with a fingerprint phase in the data deduplication pipeline, wherein the fingerprint phase is configured to calculate a fingerprint for each of the data segments;
for each of the load parameters associated with the fingerprint phase, determining, by the chunking phase, whether the load parameter has exceeded a load threshold associated with the fingerprint phase; and
throttling, by the chunking phase, the calculating of the fingerprint by the fingerprint phase in response to a determination that at least one of the load parameters associated with the fingerprint phase has exceeded the load threshold associated with the fingerprint phase.

11. The non-transitory machine-readable medium of claim 8, wherein throttling the segmenting of the data stream by the chunking phase comprises ceasing to enqueue an entry into a job queue corresponding to the chunking phase, wherein the entry commands the segmenting of the data stream by the chunking phase.

12. The non-transitory machine-readable medium of claim 8, wherein throttling the segmenting of the data stream by the chunking phase comprises delaying response to the client indicating the request has been processed.

13. The non-transitory machine-readable medium of claim 8,
wherein the load parameters associated with the chunking phase include a queue depth and a latency associated with the chunking phase; and
wherein the load threshold associated with the chunking phase is a queue depth threshold at a phase level, a latency threshold at the phase level, a queue depth threshold at a system level, or a latency threshold at the system level.

14. The non-transitory machine-readable medium of claim 8, wherein each of the protocol phase and the chunking phase is tagged with a name and a data stream identification.

15. A data processing system, comprising:
a processor; and
a memory coupled to the processor to store instructions, which when executed by the processor, cause the processor to perform operations, the operations comprising:
receiving, by a protocol phase of a data deduplication pipeline, a request from a client for reading or writing a data segment associated with a data stream stored in or to a storage system, wherein the protocol phase is configured to determine a type of request from the request received from the client;
in response to the request,
retrieving, by the protocol phase, a plurality of load parameters associated with a chunking phase in the data deduplication pipeline, wherein the chunking phase is configured to segment the data stream into data segments;
for each of the load parameters associated with the chunking phase, determining, by the protocol phase, whether the load parameter has exceeded a load threshold associated with the chunking phase; and throttling, by the protocol phase, the segmenting of the data stream by the chunking phase in response to a determination that at least one of the load parameters associated with the chunking phase has exceeded the load threshold associated with the chunking phase.

16. The data processing system of claim 15, wherein the operations further comprise:

in response to a determination that none of the load parameters associated with the chunking phase has exceeded the load threshold associated with the chunking phase, enqueuing an entry into a job queue corresponding to the chunking phase, wherein the entry commands the segmenting of the data stream by the chunking phase.

17. The data processing system of claim 16, wherein the operations further comprise:

retrieving, by the chunking phase, a plurality of load parameters associated with a fingerprint phase in the data deduplication pipeline wherein the fingerprint phase is configured to calculate a fingerprint for each of the data segments;

for each of the load parameters associated with the fingerprint phase, determining, by the chunking phase, whether the load parameter has exceeded a load threshold associated with the fingerprint phase; and throttling, by the chunking phase, the calculating of the fingerprint by the fingerprint phase in response to a determination that at least one of the load parameters associated with the fingerprint phase has exceeded the load threshold associated with the fingerprint phase.

18. The data processing system of claim 15, wherein throttling the segmenting of the data stream by t chunking phase comprises ceasing to enqueue an entry into a job queue corresponding to the chunking phase, wherein the entry commands the segmenting of the data stream by the chunking phase.

* * * * *